United States Patent Office 3,833,738
Patented Sept. 3, 1974

3,833,738
ALFALFA EXTRACT PROCESS
George Wheeler Edwards and Arrie Wood Edwards,
both of Rte. 4, Kay Drive, Jackson, Tenn. 38301
No Drawing. Continuation-in-part of application Ser. No.
109,714, Jan. 25, 1971, now Patent No. 3,780,183.
This application Sept. 19, 1973, Ser. No. 398,648
Int. Cl. A23l 1/42
U.S. Cl. 426—52                  13 Claims

ABSTRACT OF THE DISCLOSURE

Alfalfa or clover which has been previously treated with an aqueous basic solution is simultaneously digested with pancreatin and a bile containing material. A soluble fraction is then separated from the residue, both substances being useful as food for humans.

BACKGROUND OF THE INVENTION

The present application is a continuation-in-part of the co-pending parent application, "Plant Protein Product and Process" by George Wheeler Edwards and Arrie Wood Edwards, Ser. No. 109,714, filed Jan. 25, 1971, now U.S. Pat. No. 3,780,183 the entire contents of which is incorporated herein by reference.

The present invention relates generally to foods for humans and animals. More particularly, the present invention is concerned with an improved process for producing a food product from alfalfa or clover.

Alfalfa and clover contain crude protein which may be used as food for ruminants and other animals. While these plants contain protein in amounts potentially useful as a food substance for humans, such plants have been infrequently used for this purpose. A major reason for this is that these plants are not readily digestible by humans. Another reason is the fact that these plants are unpalatable to humans in their unprocessed state.

In spite of the aforementioned disadvantages of utilizing alfalfa and clover as food substances for humans, the potential of alfalfa and clover for this purpose is great—in part because of the present protein shortage in underdeveloped areas of the world, but also because of the high cost of meat and meat products in the more developed areas of the world. Problems of increasing population have further intensified these problems. The present protein shortage and/or high cost of protein production has resulted because animal husbandry is a slow, expensive and inefficient process, requiring large amounts of land and feed to produce a volume product.

In the aforementioned co-pending application, a process is provided whereby a food product for humans which is high in protein, carbohydrates, vitamins, minerals and essential amino acids is produced from alfalfa or clover. As is disclosed in that application, when alfalfa meal is treated with an aqueous basic solution having a pH not less than 8, followed by treatment or digestion, of the resulting slurry with pancreatin at a pH of about 6 to 14, a soluble fraction and an insoluble celloflour residue are obtained. Both fractions are useful as human food. That process will serve to alleviate the aforestated problems associated with prior art protein food production, and provide a less expensive, more efficient method of food production. The aforementioned process, however, has produced food products which are less than completely palatable for many food uses. Also, a further disadvantage of that process is the fact that the extraction of the soluble fraction from the insoluble residue has been somewhat less than complete. Accordingly, the present process is provided as an improvement of the aforementioned process to alleviate the problems associated therewith.

In the process comprising the present invention, after alfalfa or clover has been treated with an aqueous basic solution the resulting slurry is treated simultaneously or serially with pancreatin and a bile containing material, such as gall sac powder or bile salts.

The water soluble and insoluble portions are then separated. Both are useful as food substances. In an alternative practice of the present invention, after the pancreatin and bile digestion steps have been carried out, the insoluble residue is dried, ground and resuspended in water and again digested simultaneously or serially with pancreatin and a bile containing material, after which a second water soluble fraction and a second water insoluble residue are obtained. The second insoluble residue and second soluble fractions may be separated or, alternatively they may be dried together and ground. In either case, the purpose of the second digestion is to extract and hydrolyze the saponins which are left in the cellular material after the first digestion. The improved extraction and digestion which occurs in the practice of the present invention increases both the nutritive value and the palatability of the product. The soluble fraction from the digestion slurry can, after separation from the residue, be separated into two fractions (the low and high density extracts in Table 1). This can be done by centrifugation or by letting the soluble fraction settle. The fraction of low density is brown, while the high density fraction is dark grey to black, and the high density fraction contains more protein and fiber but less crude fat than the low density fraction.

Analysis of the food products produced by the present process reveals that both the high and low density soluble fractions, after separation from the insoluble celloflour residue, contain an amount of protein which is about the same or slightly less than that of the unprocessed alfalfa or clover. The fat content of the soluble fraction is higher than that of the ether extract of the unprocessed plant material from which the soluble fraction is obtained. This indicates that the lipid in the alfalfa or clover is in the form of a lipoprotein which is released in the above digestive procedure. Also, the soluble fraction is higher in carbohydrate than is the alfalfa or clover from which it is prepared.

The insoluble residue is a celloflour which is slightly green in color. Its protein content is approximately equal to that of the unprocessed plant material from which it is prepared. The fat content of the celloflour is higher than that of the ether extract of the alfalfa or clover. The celloflour is higher in crude fiber, but lower in nitrogen-free extract (carbohydrate), than the alfalfa or clover. Furthermore, the celloflour is lower in ash than the alfalfa or clover.

One interesting characteristic of the celloflour residue is the fact that it is very similar in composition to oatmeal. Rolled oats, for example, has a carbohydrate content of 68.2%, as compared to 65.6% for the celloflour residue. (The carbohydrate content of the celloflour residue is found to be 39% crude fiber and 26.6% nitrogen free extract.) The protein and fat content of the celloflour residue and rolled oats are approximately the same. The ash content of rolled oats is, however, much less than that of the celloflour residue. This data is summarized in the following Table 1.

grinding. The soluble fraction may be concentrated to the desired point by evaporation of water at atmospheric pres-

TABLE 1

| | Rolled oats* | Low density extract | High density extract | Celloflour | (20%) alfalfa meal*** | Whole wheat flour | White flour |
|---|---|---|---|---|---|---|---|
| Moisture, percent | 8.3 | 7.50 | 43.40 | 5.20 | 6.88 | 12.0 | 12.0 |
| Crude Protein, percent | 14.2 | **14.70 / 13.57 | 17.80 / 10.06 | 16.65 / 15.75 | 20.64 | 13.3 | 10.5 |
| Crude fat, percent | 7.4 | 10.80 / 10.00 | 7.00 / 4.00 | 8.45 / 8.00 | 3.58 | 2.0 | 1.0 |
| Crude fiber, percent | | 0.021 / 0.02 | 8.8 / 5.00 | 39.00 / 37.00 | 20.15 | | |
| Nitrogen free extract (carbohydrates), percent | 68.2 | 44.20 / 40.86 | 39.90 / 22.50 | 26.60 / 25.20 | 38.42 | 71.0 | 76.0 |
| Ash, percent | 1.9 | 30.3 / 28.05 | 26.8 / 15.04 | 9.36 / 8.85 | 10.34 | 1.7 | 1.4 |
| Total digestible nutrient, percent | | 47.40 / 43.62 | 48.50 / 27.73 | 53.50 / 50.63 | | | |

*Published in Peterson and Strong, "Proximate Composition of Foods," *General Biochemistry*, Table A-1.
**The lower figure is based on the sample as received. The upper figure is calculated on a dry basis.
***Published in Dehydrated Alfalfa Assay Report, Third Edition; American Dehydrators Ass'n., 800 West 4th Street, Kansas City, Missouri.

These nutritional characteristics make celloflour a useful extender for addition to meats, such as sausage or hamburger, as well as other foods. When a portion of hamburger is replaced by celloflour, very little difference in flavor can be detected (see Example VI). When celloflour and/or the soluble fraction is added to yeast breads, biscuits or corn bread, the flavor of the bread is not appreciably altered. In fact, in this use the celloflour and/or the soluble fraction serves as an excellent growth medium for yeast.

While a considerable number of basic materials can be used for the extraction, it is advisable to employ an alkali metal hydroxide or carbonate, or an alkaline earth hydroxide or carbonate, or any combination of these bases in aqueous solution. Sodium hydroxide, sodium carbonate, potassium hydroxide, potassium carbonate, magnesium hydroxide, magnesium carbonate and calcium hydroxide and mixtures thereof are specific bases which can be used in aqueous solution. Sodium hydroxide, because of its low cost, effectiveness, suitability for use in food processing and ready availability, is advisably employed.

The amount of base used in the process is not critical, but usually it will vary on a dry basis within the range of 0.05% to 10% of the dry weight of alfalfa meal or clover used. The amounts of pancreatin and bile containing material used may vary from 0.005% to 0.5% of each based on the dry weight of alfalfa or clover used, with approximately .2% pancreatin and .02% bile being the optimum concentrations. The ratio of the weight of the pancreatin to the bile-containing material should be about ten to one. For example, in a preferred embodiment one pound dry alfalfa meal, one gram of pancreatin and one-tenth gram of gall sac powder are used, the combined enzymes constituting 0.25% of the dry alfalfa meal. The length of time the alfalfa or clover is treated with the base is not critical. One hour at the boiling point generally is sufficient. The time of incubation with pancreatin and the bile containing material, using a temperature in the range of 25°–65° C., likewise is not critical, with 24–40 hours generally being sufficient. However, more complete digestion is obtained with longer incubation. Although either alfalfa or clover may be used, alfalfa is preferred because of its higher protein content. The alfalfa or clover may be green or dried, but in either case should preferably be ground into a meal for ease of extraction with the base.

After digestion with pancreatin and the bile containing material is completed, the soluble fraction of the digested slurry is separated from the residue by centrifugation or filtration through coarse cloth. It has been found that if the soluble fraction is further incubated after separation from the insoluble celloflour, the pH of the fraction falls faster than when incubated with the fiber present.

In an alternative practice of the present invention, the digested slurry is dried and used as is, with or without sure or reduced pressure at a temperature of up to 100° C. The protein in the soluble fraction may be precipitated by the addition of organic solvents, such as acetone, or by adjusting the pH to 2–4 or by the combination of solvent addition and pH adjustment.

The pH of liver bile is 8–8.6, which is the pH at which the bile digestion step of this process is carried out. The main components of bile are bile salts, bile pigments, cholesterol and lecithin. The principal bile salts are glycocholic acid and taurocholic acid, which are related to the sterols.

Bile sac or gall sac powder contains a wide variety of enzymes such as esterase, phospholipase A, lipase, amylase, lactate dehydrogenase, malate dehydrogenase, transmainase, alkaline phosphatase, acid phosphatase, leucine amino peptidase, L-iditol dehydrogenase, G-6-phosphate dehydrogenase, creatine kinase and fructose diphosphate aldolase.

The sterol portion of bile salts has a great affinity for non-polar substances, *e.g.*, fat, while the carboxyl and hydroxyl groups of the molecule have a great affinity for polar solvents, such as water. Bile salts, therefore, have surfactant properties and their mode of action is akin to that of soaps.

As a result of these chemical properties, the bile salts have the ability to increase the water solubility of lipids, such as fats, cholesterol and vitamins A, D, E, and K. The increased water solubility of these otherwise practically water insoluble materials facilitates their release from the alfalfa or clover and speeds the release of other components thereof. Furthermore, the speed of hydrolysis of fats to fatty acids and glycerol in the presence of lipase is increased in the presence of bile.

After pretreatment of alfalfa or clover with a base, treatment or digestion with pancreatin and a bile containing material is clearly more effective in releasing and saponifying the fat soluble fraction of alfalfa or clover meal than treatment pancreation alone.* The fact that celloflour prepared by this procedure may be used as an additive to meat, yeast breads, corn bread, or biscuits without imparting objectional odor or flavor confirms the value of the use of bile containing material in the incubation and digestion slurry mixture.

The following are intended as examples and no unnecessary limitation of the present invention is intended thereby:

EXAMPLE I

Add together and mix 100 grams of alfalfa meal, 3.5 g. of sodium hydroxide and sufficient water to form 750–

---
*Alfalfa and clover contain a wide variety of food and grwth factors, some of which are still not identified. To release these factors and make them available for human consumption requires digestive agents with a variety of strengths. This variety of strengths is supplied by the digestion of alfalfa or clover which has previously been treated with an aqueous basic solution by the digestive agents pancreatin and bile.

800 ml. of slurry. Heat one hour at the boiling point. Cool to 55° C. and add 0.222 g. of pancreatin and 0.02 g. of gall sac powder. Allow to digest for 24–30 hours at 55° C. Separate the soluble fraction in the resulting digestion slurry from the insoluble residue. The insoluble residue may be colored with red food dye to the desired color, dried and ground to a celloflour. The soluble fraction extract may then be concentrated as desired.

EXAMPLE II

Add and mix 100 g. of alfalfa meal and 3.5 g. of sodium hydroxide with enough water to bring the total volume of the slurry to 750–800 ml. Heat one hour at the boiling point. Cool to 55° C.; add 0.05 g. of pancreatin and 0.02 g. of gall sac powder; incubate for 12–15 hours. Separate the soluble fraction in the resulting digestion slurry from the insoluble residue. Resuspend the insoluble residue in water to provide a total volume of 750 ml.; add 0.05 g. of pancreatin and 0.02 g. of gall sac powder; incubate 12–15 hours. At the end of the second digestion separate a second soluble fraction from a second insoluble residue.

EXAMPLE III

As in Example II except that gall sac powder is omitted in the first incubation.

EXAMPLE IV

The soluble extract in Examples I–III may be further processed by adding sucrose at a concentration of 1–8%. To this solution yeast is added and the solution is incubated for 24 hours. This removes the dark green color, increases the protein content and improves the palatability of the extract.

EXAMPLE V

Bread 1 pkg. dry yeast or 1 cake compressed yeast
¼ cup water
¾ cup scalded milk, cooled to lukewarm
2 tablespoons sugar
½ tablespoon salt
1 tablespoon vegetable oil
¼ cup soluble traction from Example I or celloflour from Example I
¼ cup whole wheat flour
3 cups (approximately) white flour Soften yeast in ¼ cup warm water, then add remaining water, sugar and salt; mix. Stir in oil. Add flour in two portions. Knead 5 minutes. Place in oiled bowl, cover with damp cloth and let rise at 85° F. until mass doubles in volume (1½–2 hours).

Punch down dough and proceed as with first rising. The dough should again double in volume in 30 minutes.

Punch down, round up and mold into a loaf. Place in oiled loaf pan, cover with damp cloth and let rise at 85° F. for 50–60 minutes until mass again doubles in volume. Bake 25–30 minutes at 425° F.

EXAMPLE VI

Burgers 1 lb. hamburger
¾ cub boiling water
1 beef bouillon cube
1 tablespoon celloflour
½ tsp. Worcestershire sauce
½ tsp. oregano
½ tsp. bottled garlic juice
½ tsp. dehydrated onion flakes
1 tsp. salt Dissolve bouillon cube in boiling water. Add all other ingredients except the hamburger and stir to mix. Place hamburger and flavored mixture in a grinder and grind together. The resulting mixture may be shaped into patties or meatballs or used in making meat loaves.

The foregoing detailed description has been given for clearness of understanding only, and no unnecessary limitations should be understood therefrom, as modifications will be obvious to those skilled in the art.

What is claimed is:
1. The process which comprises:
   treating a plant substance containing natural protein of the group consisting of alfalfa and clover with an aqueous basic solution having a pH not less than 8 to form a slurry;
   simultaneously or serially digesting the slurry with pancreatin at a pH of about 6 to 14 and a bile-containing material; and
   separating the soluble fraction, from the resulting digestion slurry, from the insoluble residue or fraction, both said soluble fraction and said insoluble residue being useful as food substances.
2. The process which comprises:
   treating a plant substance containing natural protein of the group consisting of alfalfa and clover with an aqueous basic solution having a pH not less than 8 to form a slurry;
   simultaneously or serially digesting the slurry with pancreatin at a pH of about 6 to 14 and a bile-containing material to form a first digestion slurry;
   separating from the first digestion slurry a first insoluble residue from a first soluble fraction;
   resuspending said first insoluble residue in aqueous solution to form a second slurry;
   simultaneously or serially digesting the second slurry with pancreatin and a bile-containing material to form a second digestion slurry; and
   separating from the second digestion slurry a second soluble fraction and a second insoluble residue;
   both said first and second soluble fractions and said first and second insoluble residues being useful as food substances.
3. The process which comprises:
   treating a plant substance containing natural protein of the group consisting of alfalfa and clover with an aqueous basic solution having a pH not less than 8 to form a slurry;
   digesting the slurry with pancreatin at a pH of about 6 to 14 to form a first digestion slurry;
   separating a first soluble fraction from the first digestion slurry thereby also separating a first insoluble residue;
   resuspending the first insoluble residue in water and digesting the resulting second slurry simultaneously or serially with pancreatin at a pH of about 6 to 14 and a bile-containing material to thereby form a second digestion slurry; and
   separating a second soluble fraction and a second insoluble residue from the second digestion slurry;
   both said first and second soluble fractions and the second insoluble residue being useful as food substances.
4. The process of claim 1 in which said bile-containing material is gall sac powder.
5. The process of claim 1 in which said bile-containing material is bile salts.
6. The process of claim 1 in which a yeast suitable for food is added to the soluble fraction after the digestion.
7. The process of claim 1 in which the aqueous basic solution contains up to 10% by weight of basic material.
8. The process of claim 1 in which the amount of pancreatin added is from 0.005% to 0.5% based on the dry weight of the plant substance.
9. The process of claim 1 in which the amount of bile- containing material added is approximately 0.02% based on the dry weight of the plant substance.

10. The dry process of claim 1 in which the amount of bile-containing material to pancreatin is in the ratio of approximately one to ten.

11. The process of claim 2 in which the bile-containing material is gal sac powder.

12. The process of claim 2 in which the bile-containing material is bile salts.

13. The process of claim 1 in which the digestion with the bile-containing material is at a pH of about 8 to 8.6.

References Cited
UNITED STATES PATENTS

| | | | |
|---|---|---|---|
| 3,220,851 | 11/1965 | Rambaud | 426—46 |
| 3,258,407 | 6/1966 | Blanchon | 426—53 X |
| 3,516,349 | 6/1970 | Bertullo et al. | 426—32 |

RAYMOND N. JONES, Primary Examiner

E. L. MASSUNG, Assistant Examiner

U.S. Cl. X.R.

426—46, 53, 212

PO-1050
(5/69)

UNITED STATES PATENT OFFICE
CERTIFICATE OF CORRECTION

Patent No. 3,833,738      Dated September 3, 1974

Inventor(s) George Wheeler Edwards and Arrie Wood Edwards

It is certified that error appears in the above-identified patent and that said Letters Patent are hereby corrected as shown below:

Column 4, line 72, change "grwth" to --growth--; column 5, line 45, change "traction" to --fraction--, line 67, change "cub" to --cup--; column 7, line 3, delete "dry".

Signed and sealed this 19th day of November 1974.

(SEAL)
Attest:

McCOY M. GIBSON JR.
Attesting Officer

C. MARSHALL DANN
Commissioner of Patents